US012041363B2

(12) United States Patent
Umeda et al.

(10) Patent No.: US 12,041,363 B2
(45) Date of Patent: Jul. 16, 2024

(54) DISPLAY CONTROL DEVICE, DISPLAY CONTROL METHOD, AND PROGRAM FOR DISPLAYING IMAGES BASED ON SATELLITE IMAGING (71) Applicant: SONY GROUP CORPORATION, Tokyo (JP)

(72) Inventors: Tetsuo Umeda, Kanagawa (JP); Itaru Shimizu, Tokyo (JP); Naomichi Kikuchi, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 75 days.

(21) Appl. No.: 17/792,564

(22) PCT Filed: Jan. 6, 2021

(86) PCT No.: PCT/JP2021/000142
§ 371 (c)(1),
(2) Date: Jul. 13, 2022

(87) PCT Pub. No.: WO2021/149485
PCT Pub. Date: Jul. 29, 2021

(65) Prior Publication Data
US 2023/0079285 A1 Mar. 16, 2023

(30) Foreign Application Priority Data
Jan. 20, 2020 (JP) .................. 2020-006727

(51) Int. Cl.
H04N 25/50 (2023.01)
G06T 5/00 (2024.01)
(Continued)

(52) U.S. Cl.
CPC ............ *H04N 25/50* (2023.01); *G06T 5/50* (2013.01); *G06T 5/92* (2024.01); *H04N 5/2625* (2013.01);
(Continued)

(58) Field of Classification Search
CPC ...... H04N 25/50; H04N 5/2625; H04N 5/268; H04N 23/681; H04N 21/2187;
(Continued)

(56) References Cited

U.S. PATENT DOCUMENTS 5,883,584 A * 3/1999 Langemann ......... G01C 11/025
455/12.1
2003/0222974 A1 12/2003 Yoneyama
(Continued)

FOREIGN PATENT DOCUMENTS

JP H09-153131 A 6/1997
JP 2000-111359 A 4/2000
(Continued)

Primary Examiner — Gevell V Selby
(74) Attorney, Agent, or Firm — Paratus Law Group, PLLC (57) ABSTRACT The present technology relates to a display control device, a display control method, and a program enabling images to be checked in real time.
A display control device includes: a receiving unit that receives small volume data that is information on current imaging by an artificial satellite; and a control unit that displays a live view image based on the small volume data on a display unit, wherein the receiving unit receives a satellite image corresponding to the live view image as large volume data at a timing different from that of the small volume data. The present technology can be applied to, for example, a satellite image processing system that processes satellite images captured by artificial satellites.

20 Claims, 6 Drawing Sheets (51) Int. Cl.
    *G06T 5/50*     (2006.01)
    *G06T 5/92*     (2024.01)
    *H04N 5/262*     (2006.01)
    *H04N 5/268*     (2006.01)
    *H04N 23/68*     (2023.01)

(52) U.S. Cl.
    CPC ........... *H04N 5/268* (2013.01); *H04N 23/681* (2023.01); *G06T 2207/10041* (2013.01)

(58) Field of Classification Search
    CPC .......... H04N 21/234363; H04N 7/183; H04N 23/632; H04N 23/633; H04N 23/80; H04N 23/661; G06T 5/009; G06T 5/50; G06T 2207/10041; B64G 1/1021
    See application file for complete search history.

(56) References Cited

U.S. PATENT DOCUMENTS

2018/0109762 A1\* 4/2018 Aich ...................... H04N 7/183
2021/0103614 A1\* 4/2021 Herz ................. H04M 1/72403
2022/0321800 A1\* 10/2022 Takekoshi ............ H04N 23/631

FOREIGN PATENT DOCUMENTS

| | | |
|---|---|---|
| JP | 2002-218439 A | 8/2002 |
| JP | 2003-512769 A | 4/2003 |
| JP | 2003-264726 A | 9/2003 |
| JP | 2006-115283 A | 4/2006 |
| JP | 2007-208481 A | 8/2007 |
| JP | 2012-138745 A | 7/2012 |
| JP | 2014-078896 A | 5/2014 |
| JP | 2019-512989 A | 5/2019 |

\* cited by examiner

DISPLAY CONTROL DEVICE, DISPLAY CONTROL METHOD, AND PROGRAM FOR DISPLAYING IMAGES BASED ON SATELLITE IMAGING

CROSS REFERENCE TO PRIOR APPLICATION

This application is a National Stage Patent Application of PCT International Patent Application No. PCT/JP2021/000142 (filed on Jan. 6, 2021) under 35 U.S.C. § 371, which claims priority to Japanese Patent Application No. 2020-006727 (filed on Jan. 20, 2020), which are all hereby incorporated by reference in their entirety.

TECHNICAL FIELD

The present technology relates to a display control device, a display control method, and a program, and more particularly, to a display control device, a display control method, and a program enabling images to be checked in real time.

BACKGROUND ART

Remote sensing is performed by imaging the ground with an observation satellite equipped with an imaging device and observing the state of a target area or object (see, for example, PTL 1 and 2). Particularly in recent years, the number of small observation satellites orbiting in low orbits is increasing.

CITATION LIST

Patent Literature

[PTL 1]
JP 2000-111359 A
[PTL 2]
JP 2006-115283 A

SUMMARY

Technical Problem

Satellite images captured by observation satellites are downlinked as the artificial satellite passes over a ground station. If the transmission volume of the image data is large, a communication delay will occur, making it difficult to check the image in real time.

The present technology has been made in view of such a situation, and enables an image to be checked in real time.

Solution to Problem

A display control device according to one aspect of the present technology provides a display control device including: a receiving unit that receives small volume data that is information on current imaging by an artificial satellite; and a control unit that displays a live view image based on the small volume data on a display unit, wherein the receiving unit receives a satellite image corresponding to the live view image as large volume data at a timing different from that of the small volume data.

A display control method according to one aspect of the present technology provides a display control method for allowing a display control device to execute: receiving small volume data that is information on current imaging by an artificial satellite; displaying a live view image based on the small volume data on a display unit; and receiving a satellite image corresponding to the live view image as large volume data at a timing different from that of the small volume data.

A program according to one aspect of the present technology provides a program for causing a computer to execute: receiving small volume data that is information on current imaging by an artificial satellite; displaying a live view image based on the small volume data on a display unit; and receiving a satellite image corresponding to the live view image as large volume data at a timing different from that of the small volume data.

In one aspect of the present technology, small volume data that is information on current imaging by an artificial satellite is received, a live view image based on the small volume data is displayed on a display unit, and a satellite image corresponding to the live view image is received as large volume data at a timing different from that of the small volume data.

The display control device according to one aspect of the present technology can be realized by causing a computer to execute a program. The program to be executed by the computer can be provided by transmitting through a transmission medium or by recording on a recording medium.

The display control device may be an independent device or an internal block constituting one device.

DESCRIPTION OF EMBODIMENTS

Modes for embodying the present technology (hereinafter referred to as embodiments) will be described below with reference to the accompanying drawings. Also, in the present specification and the figures, components having substantially the same functional configuration will be denoted by the same reference numerals, and thus repeated descriptions thereof will be omitted. The description will be made in the following order.

1. Configuration example of satellite image processing system
2. First live view image display process
3. Second live view image display process
4. Application example
5. Computer configuration example

1. Configuration Example of Satellite Image Processing System

Figure 1:
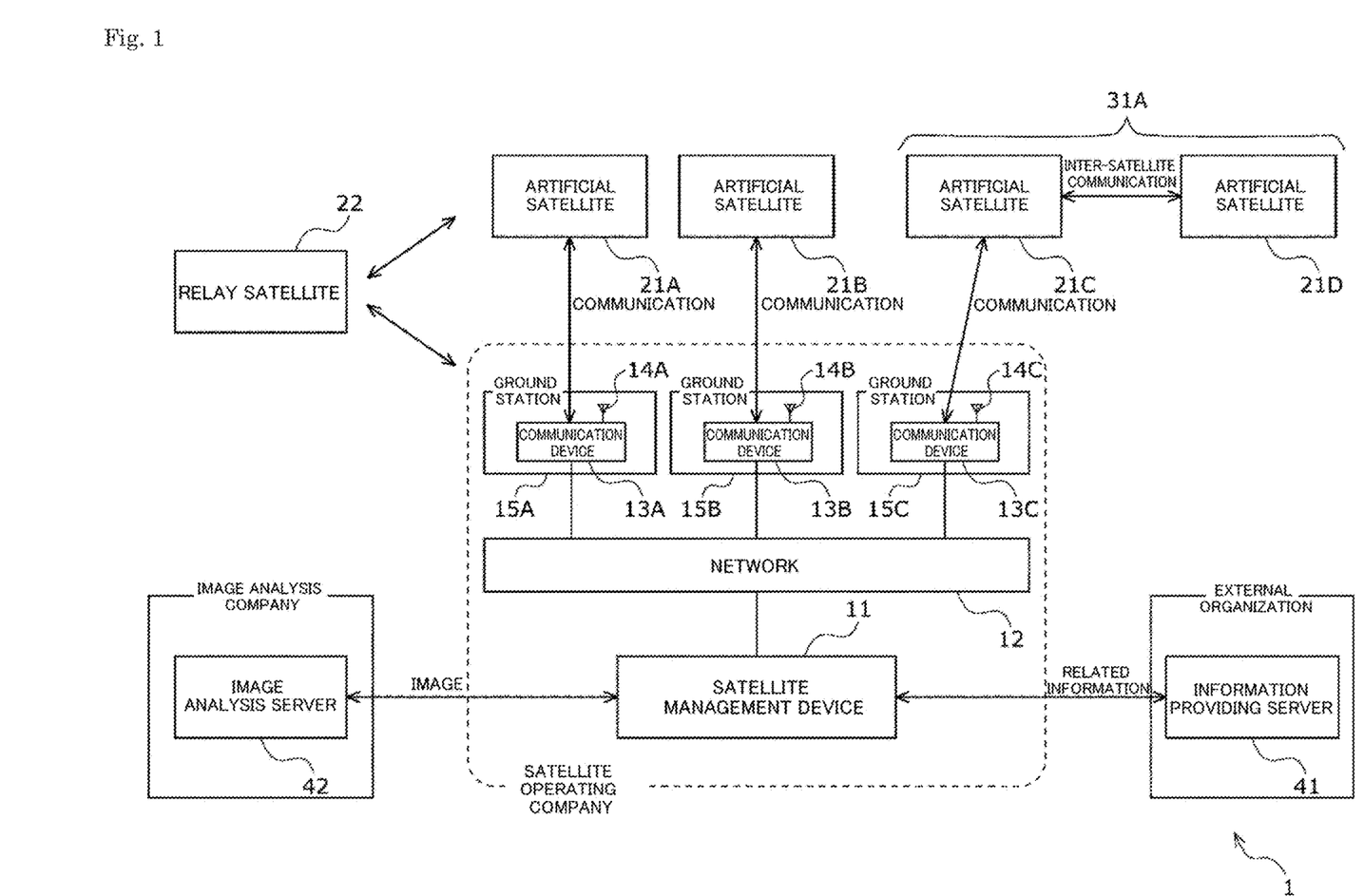
FIG. 1 is a block diagram showing a configuration example of a satellite image processing system according to an embodiment to which the present technology is applied.

FIG. 1 is a block diagram showing a configuration example of a satellite image processing system according to an embodiment to which the present technology is applied.

A satellite image processing system 1 of FIG. 1 is a system that enables satellite images captured by one or more artificial satellites 21 (hereinafter, simply referred to as satellite 21) to be checked by a device on the ground in real time. In the present embodiment, the satellite 21 is equipped with an imaging device and has at least a function of imaging the ground.

A satellite operating company has a satellite management device 11 that manages a plurality of satellites 21, and a plurality of communication devices 13 that communicate with the satellites 21. A part of the satellite management device 11 and the plurality of communication devices 13 may be a device owned by a company other than the satellite operating company. The satellite management device 11 and the plurality of communication devices 13 are connected to each other via a predetermined network 12. The communication device 13 is arranged in a ground station (ground base station) 15. Note that FIG. 1 shows an example in which the number of communication devices 13 is three, that is, communication devices 13A to 13C, but the number of communication devices 13 is arbitrary.

The satellite management device 11 manages a plurality of satellites 21 owned by the satellite operating company. Specifically, the satellite management device 11 acquires related information from an information providing servers 41 of one or more external organizations as necessary, and determines the operation plan of the plurality of satellites 21 owned by the satellite management device 11. Then, the satellite management device 11 causes a predetermined satellite 21 to perform imaging by transmitting an imaging start instruction to the predetermined satellite 21 via the communication device 13 in response to a customer's request. The satellite management device 11 acquires, displays, or stores a satellite image transmitted from the satellite 21 via the communication device 13. The acquired satellite image may be provided (transmitted) to the customer after performing predetermined image processing thereon as necessary. The acquired satellite image may be provided (transmitted) to an image analysis server 42 of an image analysis company, and may be provided to a customer after performing predetermined image processing thereon.

The information providing server 41 provided in the external organization supplies predetermined related information to the satellite management device 11 via a predetermined network in response to a request from the satellite management device 11 or periodically. The related information provided from the information providing server 41 includes, for example, the following. For example, satellite orbit information (hereinafter referred to as TLE information) described in TLE (Two Line Elements) format may be acquired from NORAD (North American Aerospace Defense Command) as the external organization as related information. For example, meteorological information such as the weather at a predetermined point on the earth and the amount of clouds may be acquired from a meteorological information providing company as an external organization.

The image analysis server 42 performs predetermined image processing on the satellite image captured by the satellite 21 supplied from the satellite management device 11 via a predetermined network. The processed image is provided to a customer of the image analysis company or supplied to the satellite management device 11 of the satellite operating company. For example, the image analysis server 42 performs metadata generation processing for adding predetermined metadata to the satellite image captured by the satellite 21, correction processing such as distortion correction of the satellite image, and image composition processing such as color composition processing. The image processing of the satellite image may be performed by the satellite operating company, and in this case, the satellite operating company and the image analysis company are the same. The satellite management device 11 and the image analysis server 42 may be realized by one device.

The communication device 13 communicates with a predetermined satellite 21 designated by the satellite management device 11 via an antenna 14 according to the control of the satellite management device 11. For example, the communication device 13 transmits an imaging start instruction to start imaging of a predetermined area on the ground to a predetermined satellite 21. The communication device 13 receives the satellite image transmitted from the satellite 21 and supplies the same to the satellite management device 11 via the network 12. The transmission from the communication device 13 of the ground station 15 to the satellite 21 is also referred to as an uplink, and the transmission from the satellite 21 to the communication device 13 is also referred to as a downlink. The communication device 13 can directly communicate with the satellite 21 and can also communicate with a relay satellite 22. As the relay satellite 22, for example, a geostationary satellite is used.

The network 12 or the network between the information providing server 41 or the image analysis server 42 and the satellite management device 11 is an arbitrary communication network, which may be a wired communication network or a wireless communication network or may be configured by both of them. The network 12 and the network between the information providing server 41 or the image analysis server 42 and the satellite management device 11 may be configured by one communication network, or may be configured by a plurality of communication networks. These networks may be communication networks or communication channels of any communication standard, such as, for example, the Internet, a public telephone network, a wide area communication network for wireless mobiles such as so-called 4G line and 5G line, a wireless communication network that performs communication compliant with WAN (Wide Area Network), LAN (Local Area Network), and Bluetooth (registered trademark) standards, a communication channel for short-range wireless communication such as NFC (Near Field Communication), a communication channel for Infrared communication, a communication network for wired communication compliant with standards such as HDMI (registered trademark) (High-Definition Multimedia Interface) and USB (Universal Serial Bus).

Each satellite 21 may be operated in a single unit or a plurality of units. A plurality of satellites 21 operated in a plurality of units constitute one satellite group 31. In FIG. 1, satellites 21A and 21B are operated as a single unit, and satellites 21C and 21D form one satellite group 31A. In the example of FIG. 1, for the sake of simplicity, an example in which one satellite group 31 is composed of two satellites 21 is shown, but the number of satellites 21 constituting one satellite group 31 is not limited to two.

Systems that operate a plurality of satellites 21 as one unit (satellite group 31) include constellation and formation flight. Constellation is a system that deploys services mainly globally by launching a large number of satellites 21 into a single or a plurality of orbital planes. Even a single satellite has a predetermined function, and a plurality of satellites 21 are operated for the purpose of improving the observation frequency and the like. On the other hand, the formation flight is a system that deploys a plurality of satellites 21 in a narrow area of about several kilometers while maintaining a relative positional relationship. Formation flight can provide services that cannot be realized by a single satellite, such as high-precision 3D measurement and speed detection of moving objects. In the present embodiment, it does not matter whether the operation of the satellite group is a constellation or a formation flight.

When the communication device 13 communicates with each satellite 21, a method of directly communicating with the satellite 21 as in the satellite 21A and the satellite 21B, and a method of indirectly communicating with the communication device 13 by performing inter-satellite communication with a satellite 21C which is the other satellite 21, as in a satellite 21D may be used. The method of indirectly communicating includes communication via the relay satellite 22. Which method is used to communicate with the ground station 15 (the communication device 13 thereof) may be determined in advance by the satellite 21 or may be appropriately selected according to the content of the communication.

In the satellite image processing system 1 configured as described above, the satellite 21 as an observation satellite images a predetermined point on the ground based on the imaging start instruction from the satellite management device 11. If the data of the image captured by the satellite 21 is transmitted as it is, a delay occurs due to a large data volume, and it is difficult to observe the image as a live view image in real time.

Therefore, the satellite image processing system 1 is configured so that an image similar to the image captured by the satellite 21 can be observed in real time by the satellite management device 11 on the ground.

Figure 2:
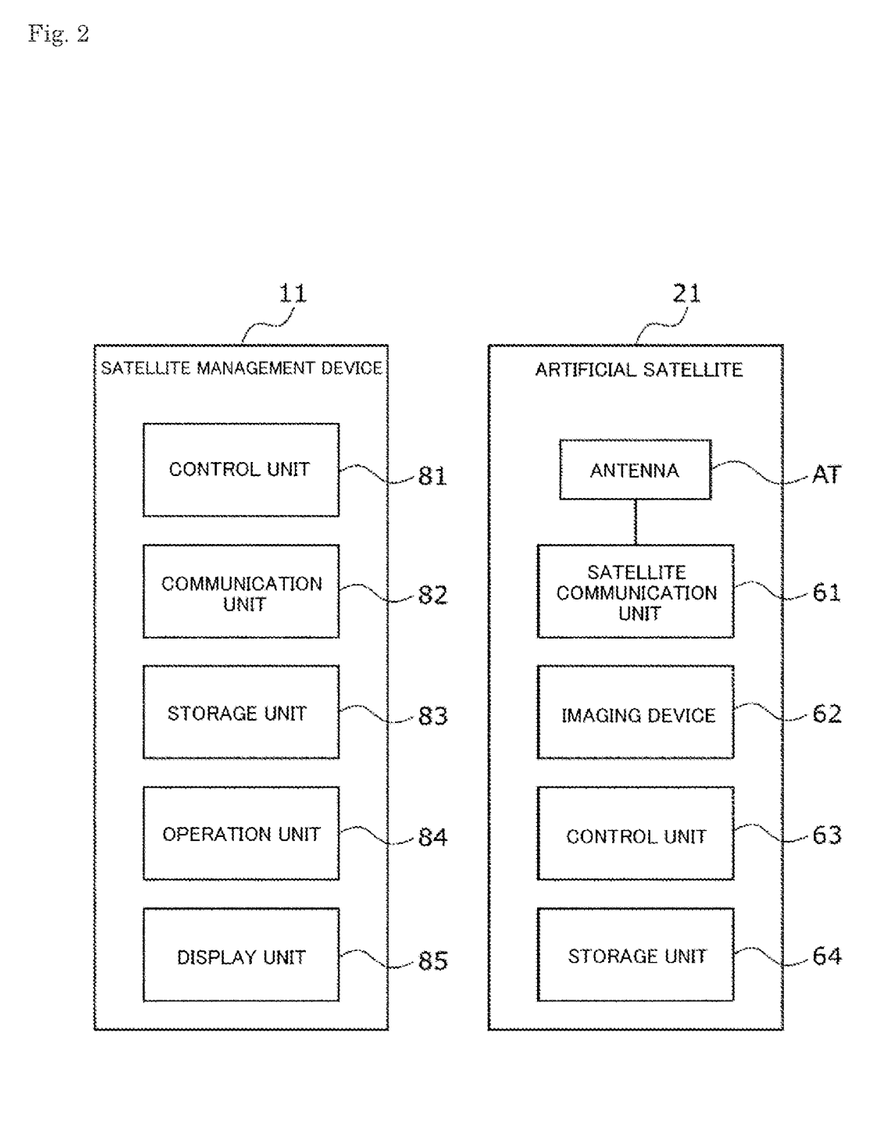
FIG. 2 is a block diagram showing a functional configuration of a satellite management device and an artificial satellite.

FIG. 2 is a block diagram showing a functional configuration of the satellite management device 11 and the satellite 21 regarding the observation of the image captured by the satellite 21.

The satellite 21 includes an antenna AT, a satellite communication unit 61, an imaging device 62, a control unit 63, and a storage unit 64. The configuration of the satellite 21 is mainly for functions related to images only, and although not shown, the satellite 21 is also equipped with propulsion devices such as solid-state motors and ion engines regarding attitude control, sensors such as a GPS receiver, a star tracker (attitude sensor), an accelerometer, and a gyro sensor regarding position control, and a power supply such as batteries and solar panels.

Based on the control of the control unit 63, the satellite communication unit 61 transmits image data of the image captured by the imaging device 62, state data indicating the state of the satellite 21 at the time of imaging, and the like to the communication device 13 of the ground station 15 via the antenna AT. The data transmitted from the satellite communication unit 61 to the communication device 13 is supplied from the communication device 13 to the satellite management device 11.

The imaging device 62 is configured of, for example, a camera module including an image sensor, and images an object based on the control of the control unit 63. When the satellite 21 is a synthetic aperture radar (SAR) satellite, the imaging device 62 is configured of a radar device.

The control unit 63 controls the operation of the entire satellite 21. For example, the control unit 63 causes the imaging device 62 to perform imaging based on the imaging start instruction from the satellite management device 11. The control unit 63 stores the satellite image obtained by imaging as a large volume data in a storage unit 64, and also performs a volume reduction process for generating a small volume data having a volume smaller than that of the satellite image. The small volume data is, for example, an image obtained by converting the satellite image captured by the imaging device 62 into a small volume data, and state data indicating the state of the satellite 21 when the imaging device 62 performs imaging.

The storage unit 64 stores control programs executed by the control unit 63 and parameters. The storage unit 64 stores the image data (large volume data) captured by the imaging device 62 and the small volume data generated by the control unit 63, and supplies the same to the satellite communication unit 61 or the control unit 63 as necessary.

The satellite management device 11 includes a control unit 81, a communication unit 82, a storage unit 83, an operation unit 84, and a display unit 85.

The control unit 81 manages a plurality of satellites 21 owned by the satellite operating company by executing a satellite management application program stored in the storage unit 83. For example, the control unit 81 determines the operation plan of the plurality of satellites 21 using the related information acquired from the information providing server 41 as necessary, and sends an attitude control signal and an imaging instruction to each satellite 21 via the communication device 13. The control unit 81 performs processing such as displaying an observation image on the display unit 85 based on the large volume data and the small volume data of the satellite image transmitted from the satellite 21 via the communication device 13.

The communication unit 82 performs predetermined communication with the communication device 13 via the network 12 and performs predetermined communication with the image analysis server 42 according to the instruction of the control unit 81. For example, the communication unit 82 receives large volume data and small volume data related to satellite images transmitted from the satellite 21.

The storage unit 83 stores large volume data and small volume data related to the satellite image transmitted from the satellite 21 in accordance with the instruction of the control unit 81.

The operation unit 84 is configured of, for example, a keyboard, a mouse, a touch panel, or the like, and receives commands and data inputs based on user (operator) operations and supplies the same to the control unit 81.

The display unit 85 is configured of, for example, an LCD (Liquid Crystal Display) or an organic EL (Electro Luminescence) display. The display unit 85 displays the screen of the satellite management application program, displays a satellite image based on a large volume data transmitted from the satellite 21, a live view image based on a small volume data transmitted from the satellite 21, and the like.

The satellite management device 11 functions as a display control device that displays a satellite image captured by the imaging device 62 of the satellite 21 on a predetermined display unit (the display unit 85 or an external display device) based on a user's operation.

2. First Live View Image Display Process

Next, a first live view image display process for displaying a live view image for real-time observation will be described with reference to the flowchart of FIG. 3. This process starts, for example, when the user who operates the satellite management device 11 performs a live view image display start operation.

First, in step S11, the control unit 81 of the satellite management device 11 transmits an imaging start instruction to the satellite 21 via the communication unit 82.

In step S41, the control unit 63 of the satellite 21 receives the imaging start instruction transmitted from the satellite management device 11 via the satellite communication unit 61. Then, in step S42, the control unit 63 performs imaging to generate a high resolution image having a resolution of the normal performance of the imaging device 62. For example, the imaging device 62 performs imaging to generate a 4K resolution when it can perform imaging at a maximum of 4K resolution, and performs imaging to generate an HD resolution when it can perform imaging at a maximum of HD resolution. The image data of the high resolution image obtained by imaging is stored in the storage unit 64. The image data of the high resolution image may be stored in the storage unit 64 as RAW data, or may be stored in the storage unit 64 as coded data encoded by predetermined coding.

In step S43, the control unit 63 executes a volume reduction process for generating small volume data having a volume smaller than that of the high resolution image based on the high resolution image obtained by imaging.

In the volume reduction process, for example, information indicating the satellite state when the satellite 21 performed imaging is generated as small volume data. The information indicating the satellite state includes, for example, attitude information indicating the attitude of the satellite 21 when the satellite 21 performed imaging, and setting information when the imaging device 62 performs imaging (hereinafter referred to as camera setting information). The camera setting information is, for example, information related to camera setting values such as resolution, zoom magnification, shutter speed, sensitivity, and aperture. When the imaging device 62 is attached to the satellite 21 at a fixed position, the imaging range (angle of view) of the imaging device 62 can be specified based on the attitude of the satellite 21 and the zoom setting value of the imaging device 62. Thus, the attitude information of the satellite 21 can be also regarded as a part of the camera setting information.

In the volume reduction process, a low volume image obtained by converting a high resolution image obtained by imaging into a low volume image may be generated as small volume data. For example, a low resolution image obtained by converting a high resolution image to a low resolution such as VGA, a panchromatic image obtained by converting a color high resolution image into a monochrome image, image feature amount information obtained by extracting a feature amount of a characteristic subject included in a high resolution image, a partial image obtained by trimming only a part of a high resolution image, and the like can be generated as small volume data. Examples of image feature amount information obtained by extracting the feature amount of a high resolution image include, for example, information indicating the characteristics of the shape of clouds, information on dynamic subjects such as airplanes, information on the tint of light rays such as red sunset, and information on the reflection position of the ground surface due to sunlight such as the reflection state of the sea or lake.

In the volume reduction process, a low frame rate image obtained by converting the frame rate of a high resolution image obtained by imaging to a lower frame rate may be generated as small volume data. For example, the control unit 63 generates a low frame rate image obtained by converting the frame rate of a high resolution image of 30 fps into a frame rate of 1 fps as small volume data.

The small volume data is data generated by performing the volume reduction process on information regarding the current imaging by the satellite 21.

In step S44, the control unit 63 transmits the small volume data generated by the volume reduction process to the satellite management device 11 via the satellite communication unit 61. The satellite 21 repeatedly executes the processes of steps S42 to S44 described above until an imaging end instruction is transmitted from the satellite management device 11. By repeating steps S42 to S44, small volume data is transmitted to the satellite management device 11 at a predetermined frame rate. Since the small volume data has a small volume, it can be transmitted in frame units without delay.

In step S12, the control unit 81 of the satellite management device 11 receives the small volume data transmitted from the satellite 21 via the communication unit 82. In step S13, a complementary process for complementing the small volume data is executed to generate a live view image. Then, in step S14, the control unit 81 causes the display unit 85 to display the generated live view image.

When performing the complementary process, the control unit 81 acquires related information from one or more information providing servers 41 of the external organization as necessary. Related information includes, for example, the following. For example, the control unit 81 can acquire the TLE information as related information and specify the position of the satellite 21 at the imaging time. For example, the control unit 81 acquires, as the related information, archive images (baseline images) which are satellite images the same imaging point of the past (for example, a few days ago or a month ago), accumulated by operating companies that operate other satellite observation services, and quasi-real-time images that are satellite images of the same imaging point at a relatively close time of several tens of minutes to several hours before the current time. Naturally, if a similar image is stored in the storage unit 83 of itself (the satellite management device 11) instead of the operating company that operates another satellite observation service, it can be used. It is preferable that the archive image or the quasi-real-time image to be acquired has the same season, imaging time, weather conditions, and the like as when the small volume data is generated. For example, the control unit 81 can acquire meteorological information such as the weather, the cloud distribution, the cloud amount, and the position information of the sun at the same imaging point when the small volume data is generated from the meteorological information providing company as an external organization. For example, the control unit 81 can acquire AIS (Automatic Identification System) information indicating the positions of ships and airplanes at the imaging time as the related information from the information providing server 41 of an operation information providing company that provides the operation information of ships and airplanes.

The control unit 81 executes a complementary process using the above-mentioned related information as necessary, and generates a live view image in which an image (satellite image) captured by the satellite 21 is estimated from the small volume data.

For example, when the small volume data is information indicating the satellite state such as the attitude information of the satellite 21 and the camera setting information, the control unit 81 uses the TLE information, the baseline image, the quasi-real-time image, and the like as related information, and reproduces the image captured by the imaging device 62 by CG (computer graphics) or the like at the angle of view captured by the imaging device 62 to generate a live view image.

For example, when the small volume data is a low resolution image obtained by converting a high resolution image to a low resolution such as VGA, the control unit 81 generates a high resolution image from the low resolution image using super-resolution technology to obtain a live view image. At this time, a baseline image or a quasi-real-time image may be acquired as related information and interpolation processing or the like may be performed thereon.

For example, when the small volume data is a panchromatic image obtained by converting a color high resolution image into a monochrome image, the control unit 81 generates a color high resolution image from the panchromatic image using machine learning to obtain a live view image. At this time, a colorization process may be performed using the image feature amount information extracted from the feature amount included in the high resolution image.

For example, when the small volume data is image feature amount information obtained by extracting the feature amount included in a high resolution image, the control unit 81 reproduces a characteristic subject from Information on cloud shape, dynamic subject, and tint of light rays and information on reflection position of sunlight as image feature amount information and superimposes the characteristic subject on an archive image or a quasi-real-time image to generate a live view image. When a panchromatic image and image feature amount information are acquired as small volume data, for example, a process of adding the tint of light rays to the panchromatic image or a process of superimposing a cloud shape and a dynamic subject on the panchromatic image may be performed. External information can be also used for meteorological information and the position of dynamic subjects.

For example, when the small volume data is a low frame rate image, the control unit 81 generates a live view image by interpolating and generating an image between the frames of the acquired low frame rate image to increase the frame rate. The frame rate of the live view image does not have to be the same as the frame rate of the high resolution image.

The complementary process of step S13 may be omitted. For example, when the small volume data is a low resolution image obtained by converting a high resolution image to a low resolution, or a panchromatic image obtained by converting a high resolution image into a monochrome image, the complementary process may not be performed and the low resolution image or the panchromatic image may be displayed on the display unit 85 as it is as a live view image.

In the display of the live view image in step S14, the control unit 81 may display the live view image displayed on the display unit 85 so that the user can understand that the live view image is an image estimated from the small volume data. For example, information (characters) indicating that it is an estimated image may be superimposed on the live view image, or an outer frame image indicating that it is an estimated image may be added and displayed on the outer periphery of the live view image.

In step S15, the control unit 81 determines whether the user's operation on the satellite 21 has been performed by the operation unit 84. When it is determined in step S15 that the user's operation has not been performed, the process returns to step S12, and the processes of steps S12 to S15 described above are repeated.

On the other hand, when it is determined in step S15 that the user's operation has been performed, the process proceeds to step S16, and the control unit 81 transmits a control instruction corresponding to the user's operation to the satellite 21 via the communication unit 82.

Examples of the user's operation in step S15 include the following operations. For example, the user may perform an operation of instructing a change of camera setting information such as a resolution, a zoom magnification, a shutter speed, a sensitivity, and an aperture. For example, an operation of changing the imaging direction (imaging point) of the imaging device 62 may be performed When the imaging device 62 is attached to the satellite 21 at a fixed position, the attitude of the satellite 21 itself is changed in response to an instruction to change the imaging direction. When the imaging device 62 has a movable portion capable of changing the relative position with respect to the satellite 21, the attitude of the satellite 21 itself may be changed in response to an instruction to change the imaging direction, or the relative position of the imaging device 62 may change. The zoom magnification may be either optical zoom or digital zoom.

For example, as a user operation in step S15, the user may give a live view image transmission instruction requesting a large volume data which is a high resolution image corresponding to the live view image displayed on the display unit 85.

In line with the processing of step S16 of the satellite management device 11, the control unit 63 of the satellite 21 receives the control instruction transmitted from the satellite management device 11 via the satellite communication unit 61 in step S45.

Subsequently, in step S46, the control unit 63 determines whether the control instruction from the satellite management device 11 is a large volume data transmission instruction.

When it is determined in step S46 that the control instruction from the satellite management device 11 is not a large volume data transmission instruction, the process proceeds to step S47, and the control unit 63 performs control based on the control instruction. For example, when the control instruction is a change of camera setting information such as resolution and zoom magnification, the control unit 63 performs control to change a part of the camera setting information of the imaging device 62 to a designated setting value. After the process of step S47, the camera setting value of the imaging device 62 for capturing a high resolution image, which is repeatedly executed in steps S42 to S44 described above, is changed.

As a general control flow, after the camera setting value of the imaging device 62 is changed in response to a control instruction from the satellite management device 11, capturing of high resolution image starts with the changed camera setting value. Therefore, there is a slight delay before the user's camera setting information change instruction is reflected in the live view image.

However, in the case of the following combination of specific imaging conditions and the camera setting information change instruction, it is possible to reduce the delay felt by the user when checking the live view image.

For example, in the case of capturing the high resolution image in step S42 described above, when the imaging device 62 changes a predetermined camera setting value to a plurality of values, and performs bracket shooting in which imaging is performed with a plurality of different camera setting values, that is, when the imaging device 62 performs bracket shooting with the camera setting information instructed to be changed by the user, small volume data based on a high resolution image captured with the camera setting value instructed to be changed by the user can be immediately transmitted to the satellite management device 11.

For example, when the data transmitted as small volume data is partial image data in which only a partial region of a high resolution image is trimmed, and the user's camera setting information change instruction is to change the zoom magnification or the angle of view, a partial image having a zoom magnification and an angle of view after the change can be generated using the high resolution image before trimming, and can be immediately transmitted to the satellite management device 11 as small volume data.

Figure 4:
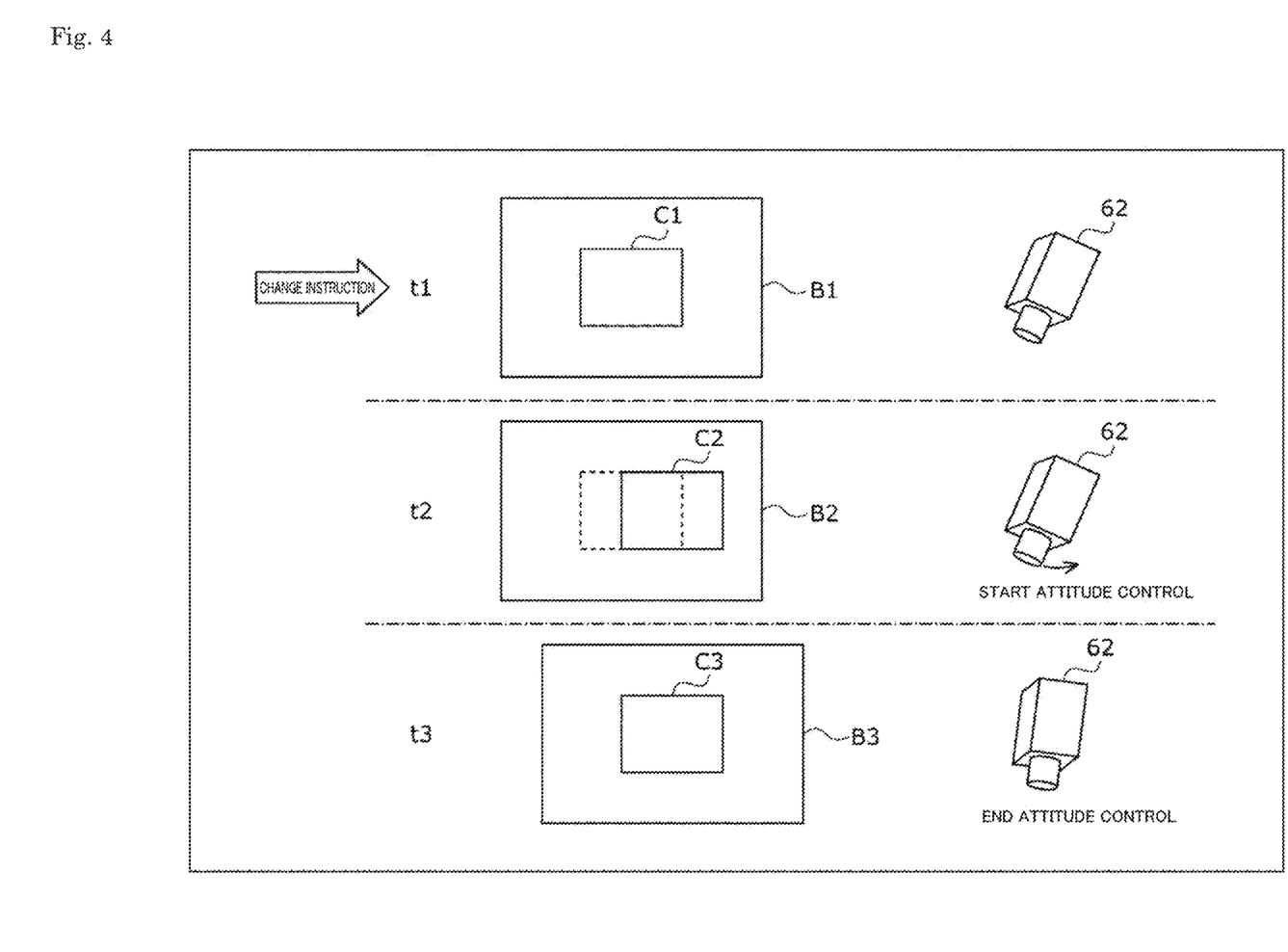
FIG. 4 is a diagram illustrating a process according to a user's control instruction.

With reference to FIG. 4, an example in which the user's camera setting information change instruction is to change the angle of view will be described.

At time t1, the user issues a camera setting information change instruction to move the angle of view to the right while looking at the partial image C1 while observing the partial image C1 obtained by trimming only the central portion of the high resolution image B1 on the display unit 85.

At time t2, the control unit 63 of the satellite 21 receives the camera setting information change instruction, and starts the attitude control to change the attitude of the imaging device 62 in the instructed direction. However, since the attitude of the imaging device 62 is not immediately changed to the desired attitude, the angle of view of the high resolution image B2 captured by the imaging device 62 at time t2 is substantially the same as the angle of view of the high resolution image B1 at time t1. The control unit 63 trims the partial image C1 corresponding to the angle of view instructed by the user from the high resolution image B2 captured by the imaging device 62 at time t2, and immediately transmits the same to the satellite management device 11 as small volume data.

When the attitude of the imaging device 62 coincides with the imaging direction designated by the user at time t3, the partial image C3 obtained by trimming only the central portion of the high resolution image B3 is transmitted to the satellite management device 11 as small volume data.

As described above, since the partial image having the angle of view designated by the user can be displayed on the display unit 85 before the attitude of the imaging device 62 reaches the state instructed to be changed by the user, it is possible to reduce the delay felt by the user checking the live view image.

Figure 3:
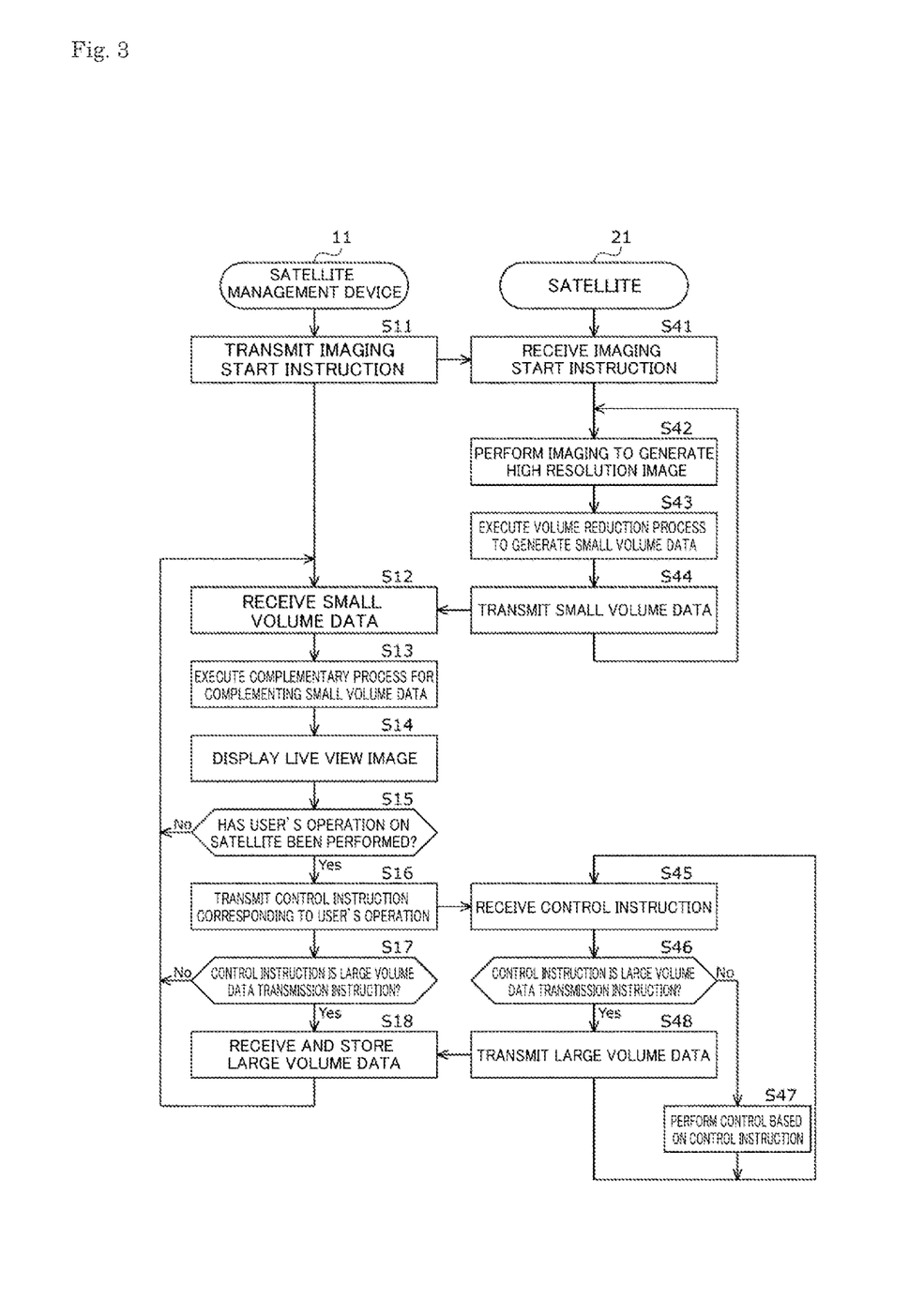
FIG. 3 is a flowchart of a first live view image display process.

Returning to the flowchart of FIG. 3, when it is determined in step S46 that the control instruction from the satellite management device 11 is a large volume data transmission instruction, the process proceeds to step S48, and the control unit 63 transmits the instructed large volume data to the satellite management device 11 via the satellite communication unit 61. That is, the data of the high resolution image corresponding to the live view image displayed on the display unit 85 in the process of step S14 is transmitted from the satellite 21 to the satellite management device 11.

In the satellite management device 11, after the control instruction corresponding to the user's operation is transmitted to the satellite 21 in step S16, the process proceeds to step S17, and the control unit 81 determines whether the control instruction transmitted to the satellite 21 is a large volume data transmission instruction.

When it is determined in step S17 that the control instruction transmitted to the satellite 21 is not a large volume data transmission instruction, the process returns to step S12, and the processes after step S12 described above are executed again.

On the other hand, when it is determined in step S17 that the control instruction transmitted to the satellite 21 is a large volume data transmission instruction, the process proceeds to step S18, and the control unit 81 receives the large volume data transmitted from the satellite 21 in response to the transmitted control instruction and stores the same in the storage unit 83. After step S18, the process returns to step S12, and the processes after step S12 described above are executed again.

The first live view image display process is continuously executed until the user performs a live view image display end operation, and when the live view image display end operation is performed, the first live view image display process ends.

In the first live view image display process, the satellite management device 11 receives small volume data having a volume smaller than that of a high resolution image having the resolution of the normal performance of the imaging device 62 from the satellite 21. Since the small volume data has a small volume, it can be transmitted in frame units without delay, so that the live view image based on the small volume data can be displayed in real time. Then, based on the instruction of the user who has checked the live view image displayed on the display unit 85, large volume data which is a high resolution image corresponding to the live view image is received and stored.

The transmission and reception of large volume data, which is the process of steps S18 and S48 described above, may be executed at a timing other than during the execution of the first live view image display process described above, in other words, at a timing other than when the live view image is observed in real time.

When there are two or more communication systems between the satellite 21 and the communication device 13, the transmission and reception of large volume data may be performed in the background different from the transmission and reception of small volume data. At this time, since the large volume data takes a long communication time, the number of times the large volume data is transmitted is smaller than that of small volume data. For example, when the small volume data is data of 30 fps, the large volume data is data of 1 fps, or data transmitted once every 10 minutes. The large volume data transmitted and received in the background can be used as a quasi-real-time image in the complementary process of step S13 described above.

The large volume data can be used as teacher data when machine learning for estimating a live view image is performed as the complementary process. Using machine learning to generate the live view image, the accuracy of the live view image generated by estimation can be improved.

3. Second Live View Image Display Process

Next, a second live view image display process executed by the satellite image processing system 1 will be described.

In the first live view image display process described above, the satellite 21 captures a high resolution image based on an imaging start instruction from the satellite management device 11, generates small volume data based on the high resolution image, and transmits the same to the satellite management device 11. In this case, the high resolution image is stored in the storage unit 64, and is transmitted to the satellite management device 11 as large volume data at another timing as necessary.

Figure 5:
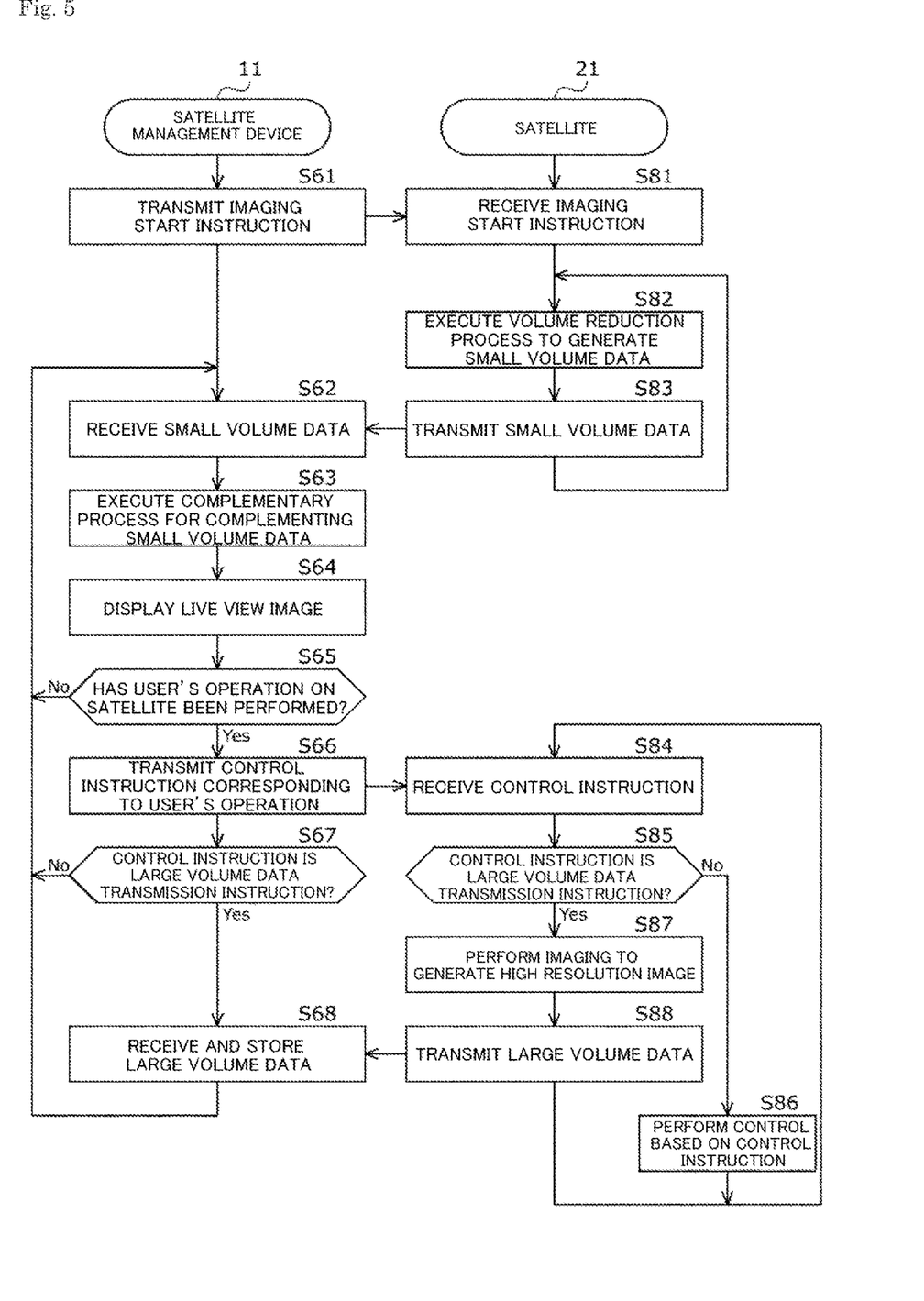
FIG. 5 is a flowchart of a second live view image display process.

On the other hand, in the second live view image display processing, the satellite 21 does not capture a high resolution image, but performs imaging for generating small volume data. Then, the satellite 21 captures the high resolution image corresponding to the live view image and transmits the same as large volume data only when the user observing the live view image gives an instruction to capture the high resolution image.

The second live view image display process will be described with reference to the flowchart of FIG. 5. This process starts, for example, when the user who operates the satellite management device 11 performs a live view image display start operation.

First, in step S61, the control unit 81 of the satellite management device 11 transmits an imaging start instruction to the satellite 21 via the communication unit 82.

In step S81, the control unit 63 of the satellite 21 receives the imaging start instruction transmitted from the satellite management device 11 via the satellite communication unit 61. Then, in step S82, the control unit 63 executes a small volume data generation process.

In the small volume data generation process, the same small volume data as the first live view image display process described above is generated. For example, information indicating the satellite state when the satellite 21 performed imaging is generated as small volume data. Alternatively, a low volume image having a smaller volume than the high resolution image captured with the normal performance of the imaging device 62, for example, a low resolution image having a lower resolution than a color high resolution image, a panchromatic image obtained by converting a color high resolution image into a monochrome image, image feature amount information obtained by extracting the feature amount of a characteristic subject included in a high resolution image, a partial image corresponding to a partial region of a high resolution image, and a low frame rate image whose frame rate is lower than that of a high resolution image, is generated as the small volume data.

In step S83, the control unit 63 transmits the small volume data generated by the small volume data generation process to the satellite management device 11 via the satellite communication unit 61. The satellite 21 repeatedly executes the processes of steps S82 and S83 until the imaging end instruction is transmitted from the satellite management device 11. By repeating steps S82 and S83, small volume data is transmitted to the satellite management device 11 at a predetermined frame rate. Since the small volume data has a small volume, it can be transmitted in frame units without delay.

In step S62, the control unit 81 of the satellite management device 11 receives the small volume data transmitted from the satellite 21 via the communication unit 82. In step S63, a complementary process for complementing the small volume data is executed to generate a live view image. Then, in step S64, the control unit 81 causes the display unit 85 to display the generated live view image.

The details of the complementary process in step S63 and the display of the live view image in step S64 are the same as those of the first live view image display process described above, and thus the description thereof will be omitted. Moreover, the complementary process of step S63 may be omitted.

In step S65, the control unit 81 determines whether the user's operation on the satellite 21 has been performed by the operation unit 84. When it is determined in step S65 that the user's operation has not been performed, the process returns to step S62, and the processes of steps S62 to S65 described above are repeated.

On the other hand, when it is determined in step S65 that the user's operation has been performed, the process proceeds to step S66, and the control unit 81 transmits a control instruction corresponding to the user's operation to the satellite 21 via the communication unit 82. The operation that the user can perform while observing the live view image is the same as that of the first live view image display process described above.

In line with the processing of step S66 of the satellite management device 11, the control unit 63 of the satellite 21 receives the control instruction transmitted from the satellite management device 11 via the satellite communication unit 61 in step S84.

Subsequently, in step S85, the control unit 63 determines whether the control instruction from the satellite management device 11 is a large volume data transmission instruction.

When it is determined in step S85 that the control instruction from the satellite management device 11 is not a large volume data transmission instruction, the process proceeds to step S86, and the control unit 63 performs control based on the control instruction. For example, when the control instruction is a change of camera setting information such as resolution and zoom magnification, the control unit 63 performs control to change a part of the camera setting information of the imaging device 62 to a designated setting value. After the process of step S86, the camera setting value of the imaging device 62 for generating small volume data, which is repeatedly executed in steps S82 and S83 described above, is changed.

On the other hand, when it is determined in step S85 that the control instruction from the satellite management device 11 is a large volume data transmission instruction, the process proceeds to step S87, and the control unit 63 performs imaging to generate a high resolution image having the resolution of the normal performance of the imaging device 62. The generated high resolution image is stored in the storage unit 64. Subsequently, in step S88, the control unit 63 transmits the image data of the generated high resolution image as large volume data to the satellite management device 11 via the satellite communication unit 61.

In the satellite management device 11, after the control instruction corresponding to the user's operation is transmitted to the satellite 21 in step S66, the process proceeds to step S67, and the control unit 81 determines whether the control instruction transmitted to the satellite 21 is a large volume data transmission instruction.

When it is determined in step S67 that the control instruction transmitted to the satellite 21 is not a large volume data transmission instruction, the process returns to step S62, and the processes after step S62 described above are executed again.

On the other hand, when it is determined in step S67 that the control instruction transmitted to the satellite 21 is a large volume data transmission instruction, the process proceeds to step S68, and the control unit 81 receives the large volume data transmitted from the satellite 21 according to the transmitted control instruction and stores the same in the storage unit 83. After step S68, the process returns to step S62, and the processes after step S62 described above are executed again.

The second live view image display process is continuously executed until the user performs a live view image display end operation, and when the live view image display end operation is performed, the second live view image display process ends.

Similarly to the first live view image display process, transmission and reception of large volume data, which is the process of steps S68 and S88 described above, may be executed at a timing other than during the execution of the second live view image display process described above, in other words, at a timing other than when the live view image is observed in real time.

According to the first and second live view image display processes executed by the satellite image processing system 1, small volume data is transmitted when observing a live view image, and a high resolution image is transmitted to the satellite management device 11 as large volume data at another timing as necessary. In this way, the user can check the image on the ground in real time.

4. Application Example

The present technology can be applied not only to satellite image processing systems that remotely instruct imaging by artificial satellites, but also to remote control and remote monitoring of mobile systems operated in remote areas.

The mobile system is a system including, for example, a robot, particularly a remote-existing robot (telexistence robot), an autonomous traveling vehicle, an autonomous aircraft (drone), a manned traveling vehicle, or a manned aircraft as a mobile device.

In these mobile systems, a user who operates and monitors the mobile device from a remote location can check the minimum situation using a live view image with small volume data.

The live view image can be generated by executing the complementary process for complementing the small volume data, as in the case of the satellite image processing system 1 described above.

For example, an assumed image can be reproduced (estimated) based on the attitude information, position information, and the like of the mobile device. At this time, when the movement route and existence environment of the mobile device are known, or when an archive image of the same point in the past or a quasi-real-time image of the same point taken at a relatively close time is accumulated as information on the movement route and existence environment, they can be used for complementation.

A live view image having a high resolution may be generated using super-resolution technology based on VGA images, a color high resolution image may be generated from a panchromatic image, and low frame rate images may be interpolated to generate a live view image having a high frame rate.

A live view image based on the feature amount information can be also generated. For example, when the movement route and existence environment of the mobile device are known, or when information on the movement route and existence environment is accumulated, only the real-time feature amount of a subject unique in the movement route and existence environment may be extracted from an archive image to generate an estimated image.

5. Computer Configuration Example

The above-described series of processing executed by the satellite management device 11 can also be performed by hardware or software. When the series of processing is performed by software, a program including the software is installed in a computer. Here, the computer includes a computer which is embedded in dedicated hardware or, for example, a general-purpose personal computer capable of executing various functions by installing various programs.

Figure 6:
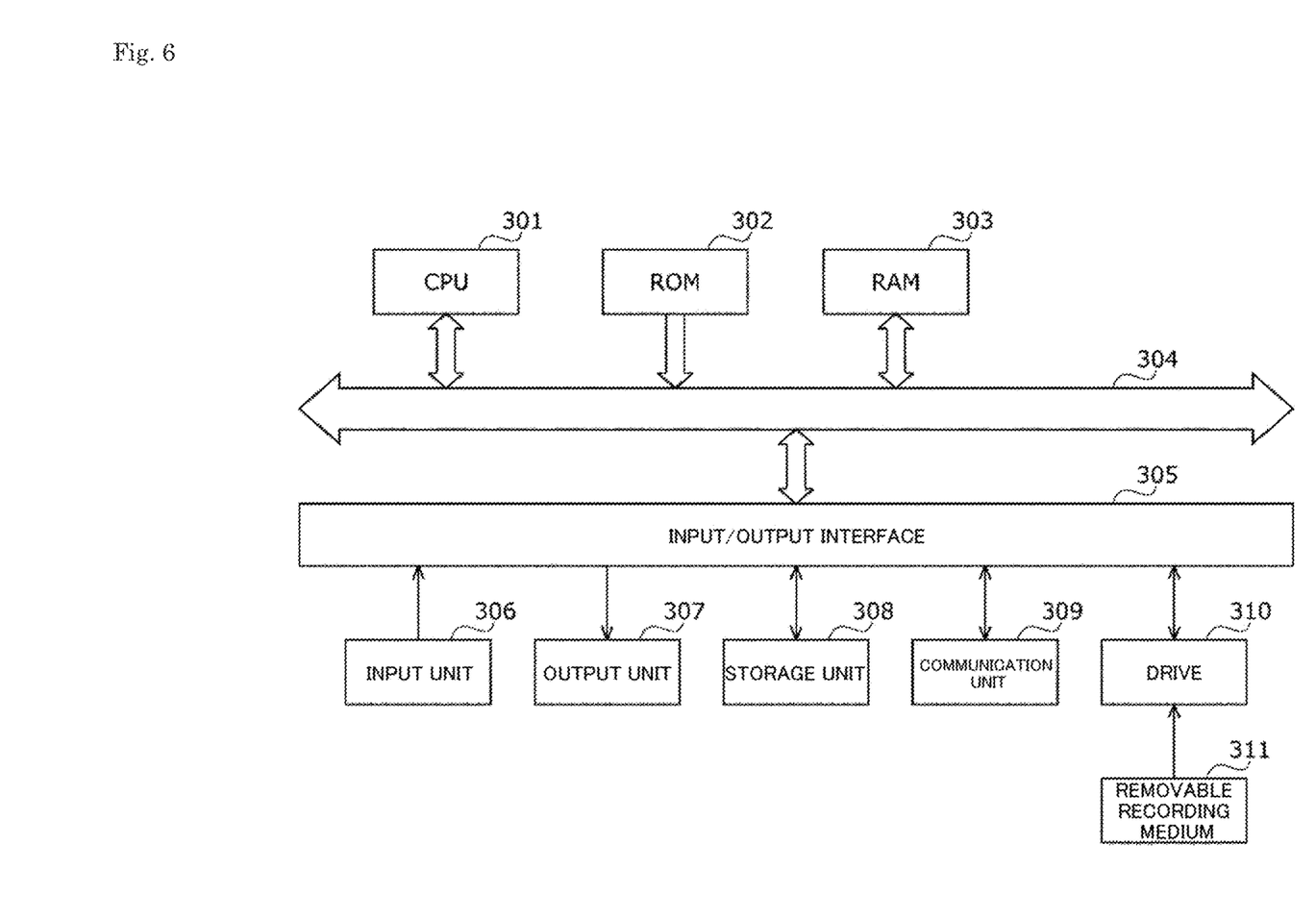
FIG. 6 is a block diagram showing a configuration example of an embodiment of a computer to which the present technology is applied.

FIG. 6 is a block diagram showing a configuration example of hardware of a computer that performs, by means of a program, a series of processing executed by the satellite management device 11.

In the computer, a central processing unit (CPU) 301, a readonly memory (ROM) 302, and a random access memory (RAM) 303 are connected to each other by a bus 304.

An input/output interface 305 is further connected to the bus 304. An input unit 306, an output unit 307, a storage unit 308, a communication unit 309, and a drive 310 are connected to the input/output interface 305.

The input unit 306 is, for example, a keyboard, a mouse, a microphone, a touch panel, or an input terminal. The output unit 307 is, for example, a display, a speaker, or an output terminal. The storage unit 308 is, for example, a hard disk, a RAM disc, or a nonvolatile memory. The communication unit 309 is a network interface or the like. The drive 310 drives a removable recording medium 311 such as a magnetic disk, an optical disc, a magneto-optical disc, or a semiconductor memory.

In the computer that has the foregoing configuration, the CPU 301 performs the above-described series of processing, for example, by loading a program stored in the storage unit 308 on the RAM 303 via the input/output interface 305 and the bus 304 and executing the program. In the RAM 303, data or the like necessary for the CPU 301 to perform various kinds of processing is also appropriately stored.

The program executed by the computer (the CPU 301) can be recorded on, for example, the removable recording medium 311 serving as a package medium for supply. The program can be supplied via a wired or wireless transfer medium such as a local area network, the Internet, or digital satellite broadcasting.

In the computer, by mounting the removable recording medium 311 on the drive 310, it is possible to install the program in the storage unit 308 via the input/output interface 305. The program can be received by the communication unit 309 via a wired or wireless transfer medium to be installed in the storage unit 308. In addition, the program can be installed in advance in the ROM 302 or the storage unit 308.

In the present description, the steps having been described in the flowcharts may be carried out in parallel or with necessary timing, for example, when evoked, even if the steps are not executed in time series along the order having been described therein, as well as when the steps are executed in time series.

In the present specification, the system means a set of a plurality of constituent elements (devices, modules (components), or the like) and all the constituent elements may be included or not included in the same casing. Accordingly, a plurality of devices accommodated in separate casings and connected via a network and one device in which a plurality of modules are accommodated in one casing may all be a system.

The embodiments of the present technology are not limited to the above-described embodiments, and various changes can be made without departing from the gist of the present technology.

For example, a combination of all or part of the above-mentioned plurality of embodiments may be employed.

For example, the present technology may have a configuration of clouding computing in which a plurality of devices share and process one function together via a network.

In addition, each step described in the above flowchart can be executed by one device or shared by a plurality of devices.

Further, in a case in which one step includes a plurality of processes, the plurality of processes included in the one step can be executed by one device or shared and executed by a plurality of devices.

The effects described in the present specification are merely examples and are not limited, and there may be effects other than those described in the present specification.

The present technology can employ the following configurations.

(1) A display control device including: a receiving unit that receives small volume data that is information on current imaging by an artificial satellite; and a control unit that displays a live view image based on the small volume data on a display unit, wherein the receiving unit receives a satellite image corresponding to the live view image as large volume data at a timing different from that of the small volume data.

(2) The display control device according to (1), wherein the receiving unit receives the large volume data transmitted from the artificial satellite based on an instruction of a user who has checked the live view image displayed on the display unit.

(3) The display control device according to (1) or (2), wherein the artificial satellite generates the small volume data by performing a volume reduction process of reducing a volume of the captured satellite image, and the large volume data is the satellite image before the volume reduction process is performed.

(4) The display control device according to (1) or (2), wherein the receiving unit receives a satellite image captured by the artificial satellite based on an instruction of a user who has checked the live view image displayed on the display unit as the large volume data.

(5) The display control device according to (1), wherein the small volume data is information indicating a satellite state of the artificial satellite.

(6) The display control device according to (5), wherein the information indicating the satellite state of the artificial satellite is attitude information indicating an attitude of the artificial satellite and camera setting information when the artificial satellite performed imaging.

(7) The display control device according to (1), wherein the small volume data is a low volume image obtained by converting a satellite image obtained by the imaging of the artificial satellite into an image having a small volume.

(8) The display control device according to (7), wherein the control unit displays the low volume image as it is as the live view image on the display unit.

(9) The display control device according to (1), (7), or (8), wherein the small volume data is a low resolution image obtained by converting a satellite image obtained by the imaging of the artificial satellite into an image having a low resolution.

(10) The display control device according to (1), (7), or (8), wherein the small volume data is a panchromatic image obtained by converting a satellite image obtained by the imaging of the artificial satellite into a monochrome image.

(11) The display control device according to (1), wherein the small volume data is image feature amount information obtained by extracting a feature amount of a characteristic subject included in a satellite image obtained by the imaging of the artificial satellite.

(12) The display control device according to (1), (7), or (8), wherein the small volume data is a partial image obtained by trimming only a partial region of a satellite image obtained by the imaging of the artificial satellite.

(13) The display control device according to (1), (7), or (8), wherein the small volume data is a low frame rate image obtained by converting a frame rate of a satellite image obtained by the imaging of the artificial satellite into a frame rate lower than that of the satellite image.

(14) The display control device according to any one of (1) to (13), wherein the control unit executes a complementary process for complementing the small volume data, generates the live view image, and displays the live view image on the display unit.

(15) The display control device according to (14), wherein the control unit generates the live view image using a past image obtained by imaging the same point when performing the complementary process.

(16) The display control device according to (14), wherein the small volume data is a low resolution image obtained by converting a satellite image obtained by the imaging of the artificial satellite to an image having a low resolution, or a low frame rate image obtained by converting a frame rate of the satellite image obtained by the imaging of the artificial satellite to a frame rate lower than that of the satellite image, and the control unit improves a resolution or a frame rate to generate the live view image as the complementary process.

(17) The display control device according to (14), wherein the small volume data is image feature amount information obtained by extracting a feature amount of a characteristic subject included in a satellite image obtained by the imaging of the artificial satellite, and the control unit estimates and generates the live view image using the image feature amount information as the complementary process.

(18) The display control device according to (14), wherein the small volume data is a panchromatic image obtained by converting a satellite image obtained by the imaging of the artificial satellite into a monochrome image, and the control unit generates a color live view image from the panchromatic image as the complementary process.

(19) A display control method for allowing a display control device to execute: receiving small volume data that is information on current imaging by an artificial satellite; displaying a live view image based on the small volume data on a display unit; and receiving a satellite image corresponding to the live view image as large volume data at a timing different from that of the small volume data.

(20) A program for causing a computer to execute: receiving small volume data that is information on current imaging by an artificial satellite; displaying a live view image based on the small volume data on a display unit; and receiving a satellite image corresponding to the live view image as large volume data at a timing different from that of the small volume data.

REFERENCE SIGNS LIST

1 Satellite image processing system
11 Satellite management device
13 Communication device
15 Ground station
21 Satellite
41 Information providing server
42 Image analysis server 61 Satellite communication unit
62 Imaging device
63 Control unit
64 Storage unit
81 Control unit
82 Communication unit
83 Storage unit
84 Operation unit
85 Display unit
301 CPU
302 ROM
303 RAM
306 Input unit
307 Output unit
308 Storage unit
309 Communication unit
310 Drive

The invention claimed is:

1. A display control device comprising:
a receiving unit configured to receive
small volume data that is information on current imaging obtained by an artificial satellite, and
large volume data obtained by the imaging of the artificial satellite; and
a control unit configured to initiate display of a live view image based on the small volume data on a display device,
wherein the receiving unit receives a satellite image corresponding to the live view image as the large volume data at a timing different from that of when the receiving unit receives the small volume data,
wherein the small volume data includes at least one image obtained by converting the satellite image obtained by the imaging of the artificial satellite, and
wherein the receiving unit and the control unit are each implemented via at least one processor.

2. The display control device according to claim 1, wherein
the receiving unit receives the large volume data transmitted from the artificial satellite based on an instruction of a user who has checked the live view image displayed on the display device.

3. The display control device according to claim 1, wherein
the artificial satellite generates the small volume data by performing a volume reduction process of reducing a volume of the captured satellite image, and
the large volume data is the satellite image before the volume reduction process is performed.

4. The display control device according to claim 1, wherein
the receiving unit receives the satellite image captured by the artificial satellite based on an instruction of a user who has checked the live view image displayed on the display device as the large volume data.

5. The display control device according to claim 1, wherein
the small volume data includes information indicating a satellite state of the artificial satellite.

6. The display control device according to claim 5, wherein
the information indicating the satellite state of the artificial satellite is attitude information indicating an attitude of the artificial satellite and camera setting information when the artificial satellite performed imaging.

7. The display control device according to claim 1, wherein
the small volume data includes a low volume image obtained by converting the satellite image obtained by the imaging of the artificial satellite into an image having a small volume.

8. The display control device according to claim 7, wherein
the control unit displays the low volume image as it is as the live view image on the display device.

9. The display control device according to claim 1, wherein
the small volume data includes a low resolution image obtained by converting the satellite image obtained by the imaging of the artificial satellite into an image having a low resolution.

10. The display control device according to claim 1, wherein
the small volume data includes a panchromatic image obtained by converting the satellite image obtained by the imaging of the artificial satellite into a monochrome image.

11. The display control device according to claim 1, wherein
the small volume data includes image feature amount information obtained by extracting a feature amount of a characteristic subject included in the satellite image obtained by the imaging of the artificial satellite.

12. The display control device according to claim 1, wherein
the small volume data includes a partial image obtained by trimming only a partial region of the satellite image obtained by the imaging of the artificial satellite.

13. The display control device according to claim 1, wherein
the small volume data includes a low frame rate image obtained by converting a frame rate of the satellite image obtained by the imaging of the artificial satellite to be lower than a frame rate of the satellite image.

14. The display control device according to claim 1, wherein
the control unit executes a complementary process for complementing the small volume data, generates the live view image, and displays the live view image on the display device.

15. The display control device according to claim 14, wherein
the control unit generates the live view image using a past image obtained by imaging the same point when performing the complementary process.

16. The display control device according to claim 14, wherein
the small volume data includes a low resolution image obtained by converting the satellite image obtained by the imaging of the artificial satellite to an image having a low resolution, or a low frame rate image obtained by converting a frame rate of the satellite image obtained by the imaging of the artificial satellite to a frame rate lower than that of the satellite image, and
the control unit improves a resolution or a frame rate to generate the live view image as the complementary process.

17. The display control device according to claim 14, wherein
the small volume data includes image feature amount information obtained by extracting a feature amount of a characteristic subject included in the satellite image obtained by the imaging of the artificial satellite, and the control unit estimates and generates the live view image using the image feature amount information as the complementary process.

18. The display control device according to claim 14, wherein
the small volume data includes a panchromatic image obtained by converting the satellite image obtained by the imaging of the artificial satellite into a monochrome image, and
the control unit generates a color live view image from the panchromatic image as the complementary process.

19. A display control method, executed by a display control device, the method comprising:
receiving small volume data that is information on current imaging obtained by an artificial satellite;
displaying a live view image based on the small volume data on a display device; and
receiving a satellite image corresponding to the live view image as large volume data at a timing different from when the receiving unit receives the small volume data,
wherein the small volume data includes at least one image obtained by converting the satellite image obtained by the imaging of the artificial satellite.

20. A non-transitory computer-readable storage medium having embodied thereon a program, which when executed by a computer causes the computer to execute a method, the method comprising:
receiving small volume data that is information on current imaging obtained by an artificial satellite;
displaying a live view image based on the small volume data on a display device; and
receiving a satellite image corresponding to the live view image as large volume data at a timing different from when the receiving unit receives the small volume data,
wherein the small volume data includes at least one image obtained by converting the satellite image obtained by the imaging of the artificial satellite.

* * * * *